United States Patent [19]

Hatamura et al.

[11] Patent Number: 4,708,097
[45] Date of Patent: Nov. 24, 1987

[54] INDUCTION SYSTEM FOR V-TYPE INTERNAL COMBUSTION ENGINE

[75] Inventors: Kouichi Hatamura; Tetsuo Hiraoka; Kazuaki Hokazono; Shinji Seike, all of Hiroshima, Japan

[73] Assignee: Mazda Motor Corporation, Hiroshima, Japan

[21] Appl. No.: 914,662

[22] Filed: Oct. 2, 1986

[30] Foreign Application Priority Data

Oct. 4, 1985 [JP] Japan ................................ 60-221650
Jan. 6, 1986 [JP] Japan ..................................... 61-434
Jan. 6, 1986 [JP] Japan ..................................... 61-435

[51] Int. Cl.$^4$ .......................................... F02B 75/18
[52] U.S. Cl. ............................ 123/52 M; 123/52 MV
[58] Field of Search ......... 123/52 M, 52 MB, 52 MC, 123/52 MV

[56] References Cited

U.S. PATENT DOCUMENTS

| | | | |
|---|---|---|---|
| 2,845,912 | 8/1958 | Bird, Jr. .................. | 123/52 MV |
| 2,909,165 | 10/1959 | Dolza ...................... | 123/52 MV |
| 2,947,294 | 8/1960 | Bird et al. ................ | 123/52 MV |
| 3,303,832 | 2/1967 | Platner et al. ............ | 123/52 M |
| 4,364,340 | 12/1982 | Kimura .................... | 123/52 MV |
| 4,440,120 | 4/1984 | Butler ...................... | 123/52 MV |
| 4,615,324 | 10/1986 | Choushi et al. .......... | 123/52 MV |
| 4,649,871 | 3/1987 | Hatamura et al. ........ | 123/52 MC |

FOREIGN PATENT DOCUMENTS

| | | | |
|---|---|---|---|
| 0110765 | 7/1982 | Japan ...................... | 123/52 M |
| 0077063 | 5/1984 | Japan ...................... | 123/195 C |
| 0115460 | 7/1984 | Japan ...................... | 123/52 MV |

*Primary Examiner*—Craig R. Feinberg
*Assistant Examiner*—David A. Okonsky
*Attorney, Agent, or Firm*—Fleit, Jacobson, Cohn & Price

[57] ABSTRACT

An induction system for a V-type internal combustion engine having a first and second banks respectively constituted with a plurality of cylinders and shifted with respect to each other in the direction of alignment of the cylinders, including intake ports provided to face a space between two banks, surge tank means for leading intake air to each intake port arranged above one of the banks, first intake passage means curvedly formed for feeding intake air from the surge tank means to the cylinders of the first bank, each being connected with the side portion of the surge tank means at one end thereof and with one of the intake ports of the cylinder of the first bank at the other end thereof and consisting of an upstream intake passage means and a downstream passage means, and second intake passage means curvedly formed for feeding intake air from the surge tank means to the cylinders of the second bank, each being connected with the side portion of the surge tank means at one end thereof and with one of the intake ports of the cylinder of the second bank and consisting of an upstream intake passage means and a downstream intake passage means, said first intake passage means being connected with the surge tank means at a point higher than a point where the second intake passage is connected with the surge tank means.

19 Claims, 6 Drawing Figures

INDUCTION SYSTEM FOR V-TYPE INTERNAL COMBUSTION ENGINE

BACKGROUND OF THE INVENTION

The present invention relates to an induction system for a V-type internal combustion engine, and more particularly to an induction system for a V-type internal combustion engine capable of increasing charging efficiency by utilizing a dynamic effect of intake air.

DESCRIPTION OF PRIOR ART

There is known an induction system is known which is intended to increase charging efficiency and thereby achieve a high engine power output by utilizing such a dynamic effect of intake air as an inertia effect of intake air and a harmonic resonance effect, that is, a pressure wave of the intake air. However, it is necessary for such induction system to provide a portion for inverting the direction of pressure waves generated in the intake system and feeding them back to a combustion chamber in the intake system and to further provide downstream said portion an intake passage having a sufficient length for introducing the pressure wave into the combustion chamber at an effective timing, and, therefore, there arises the problem that, the size of the induction system is inevitably large.

In order to solve such problem and reduce the size of the induction system, U.S. Pat. No. 4,440,120 discloses an induction system which is provided with a curved intake manifold connected to an intake port of each cylinder in an upper portion of a space between two banks of the V-type internal combustion engine and a surge tank (plenum chamber) connected with one end of said manifold. In this prior art induction system, since the plenum chamber common to a plurality of cylinders is provided in the upper portion of the space between the two banks and the intake passages connected with said plenum chamber and each cylinder are formed curvedly, it is possible to reduce the size of the induction system to some extent. However, as the curvature of the intake passage is increased, the pressure loss of the intake air through the intake passage increases, making it difficult to introduce a large amount of the intake air into the combustion chamber. Therefore, since there is a limit to how much the curvature of the intake passage can be increased so as to reduce the size of the system, in this prior art system the induction system has to be arranged to be projected into a space above the engine. However, since a hood occupies said space, provision of the induction system in the space is extremely restricted. Therefore, the prior art induction system could not to a satisfactory extent meet the both the requirement for increasing the the amount of intake air and that for providing the induction system in a small space simultaneously.

In order to solve the problem described above, U.S. Pat. No. 2,845,912 and 3,303,832 propose the induction systems in which the surge tank is provided in a portion above one bank and in which the intake passage connected with the intake port of each cylinder of said bank at one end and said surge tank at the other end is curved in said portion. According to these systems, it is possible to reduce the height of the induction system and the size thereof to a certain extent, since the surge tank can be arranged to be fitted to the shape of the hood.

However, in the system disclosed in U.S. Pat. No. 2,845,912, since each independent intake passage connected to each cylinder below the surge rank is connected with an upper portion of the surge tank, these intake passages inevitably project above the surge tank and it is impossible to satisfactorily reduce the height of the system. Further, since the independent intake passages connected with the cylinder of the bank provided below the surge tank are curvedly formed, but, on the other hand, the independent intake passages connected with the cylinder of another bank are arranged in a substantially straight form, the pressure losses through the intake passages are inevitably different between these two groups of intake passages and, as a result, the charging efficiencies are also different between them, which causes undesired fluctuation in torque. In addition, in the prior art system, when fuel distributing pipes for feeding fuel to fuel injection nozzles provided for each cylinder are provided for each bank, the free space between the two banks becomes narrower and it becomes more difficult to arrange the intake passages there in.

SUMMARY OF THE INVENTION

It is therefore an object of the present invention to provide a compact induction system for a V-type internal combustion engine having first and second banks the height of which can be satisfactorily reduced and in which fuel injection nozzles, fuel distribution pipes and intake passages can be easily arranged between said first and second banks.

It is a further object of the present invention to provide an induction system for a V-type internal combustion engine having a first and second banks in which the charging efficiency of the intake passage can be made uniform and in which fluctuation in torque can be prevented thereby.

According to the present invention, the above and other objects can be accomplished by an induction system for a V-type internal combustion engine having a first bank and a second bank respectively constituted with a plurality of cylinders, said first and second banks being shifted with respect to each other in the direction of alignment of said cylinders, including intake ports provided to face the space between said first and second banks, each communicated to one of said cylinders, a surge tank means having a predetermined volume for feeding intake air to the banks, said surge tank means being arranged above said first bank in the direction of alignment of said cylinders, first independent intake passage means each connected with a side portion of said surge tank means at one end thereof and with one of said intake ports of the cylinders constituting the first bank to lead intake air thereto at the other end, and second independent intake passage means each connected with a side portion of said surge tank means at one end thereof and with one of said intake ports of the cylinders constituting said second bank at the other end thereof, said first independent intake passage means being connected with said surge tank means at a point higher than a point where said second independent intake passage means is connected with said surge tank means, said first and second independent intake passage means respectively consisting of downstream intake passage means connected with said intake port and upstream intake passage means connected with said downstream intake passage means at one end thereof and with said surge tank means at the other end thereof, each said downstream intake passage means extending toward a space between said first and second banks from one of said intake ports, each said upstream intake passage means extending curvedly from a connecting portion where it is connected with said downstream intake passage means to said surge tank means.

According to the aforementioned features of the present invention, since the surge tank means is arranged above the first bank and the independent intake passage means for leading intake air into the cylinders of the first bank is connected with the side portion of the surge tank means at a point higher than the side portion thereof where the second independent intake passage means is connected with, it is possible to arrange the independent intake passage means having a desired length without undesired increase in the curvature thereof and to reduce the height of the induction system. Further, since the independent intake passage means is constituted by the downstream intake passage means extending from each intake port toward the space between the fuel distributing means and the upstream intake passage means connected with the downstream intake passage means at one end and with the surge tank means at another end and arranged to be curved above the fuel distributing means for distributing fuel into the cylinders of the first bank, the fuel injection means, the fuel distributing means and the intake passage means can be easily arranged in a narrow space between the engine and the hood without undesired interference with other means. Furthermore, since the first independent intake passage means for leading intake air into the cylinders of the first bank disposed below the surge tank means is connected with the side portion of the surge tank means at a point higher than the side portion thereof where the second independent intake passage means is connected with, the curvature of the first independent intake passage means can be minimized to decrease the pressure losses therethrough and the curvature of the second independent intake passage means can be increased so that the difference between pressure losses therethrough and those through the first independent intake means can be minimized and, as a result, it is possible to prevent the fluctuation in torque.

According to another aspect of the present invention, there is provided an induction system for V-type internal combustion engine having a first bank and a second bank constituted with a plurality of cylinders respectively and shifted with respect to each other in the direction of alignment of said cylinders, including intake ports provided to face the space between said first and second banks, each communicated to one of said cylinders, fuel injection means for injecting fuel into said cylinders, each provided in the vicinity of one of said intake ports, fuel distributing means for distributing fuel to said fuel injection means arranged in the direction of alignment of said cylinders in a space between said first and second banks, each connected with one of said fuel injection means, a first and second surge tank means having a predetermined volume, each feeding intake air to one of said banks, said first surge tank means overlying said second surge tank means, said first and second surge tank means being arranged in the direction of alignment of said cylinders above said first bank, first independent intake passage means each connected with the side portion of said first surge tank means at one end thereof and with one of said intake ports of the cylinders constituting the first bank to lead intake air thereto at the other end, and second independent intake passage means each connected with the side portion of said second surge tank means at one end thereof and with one of said intake ports of the cylinders constituting said second bank at the other end thereof, said first and second independent intake passage means consisting of downstream intake passage means and upstream intake passage means, each said downstream intake passage means connected with one of said intake ports and extending toward a space between said fuel distributing means, each said upstream intake passage means being curved above the fuel distributing means for distributing fuel to the fuel injector means provided for the cylinders of the first bank and connected with said downstream intake passage means at one end thereof and with said first or second surge tank means at the other end thereof.

According to the aforementioned second aspect of the present invention, since the first surge tank means and the second surge tank means are provided and the first independent intake passage means and the second independent intake passage means are communicated with the different surge tank means respectively, there can be realized the additional feature that the interference between intake air for the respective cylinders can be prevented by properly selecting the firing order of the cylinders, in addition to the above described advantages.

The above and other objects and features of the present invention will become apparent from the following descriptions taking reference to the accompanying drawings.

DESCRIPTION OF THE PREFERRED EMBODIMENT

Figure 1:
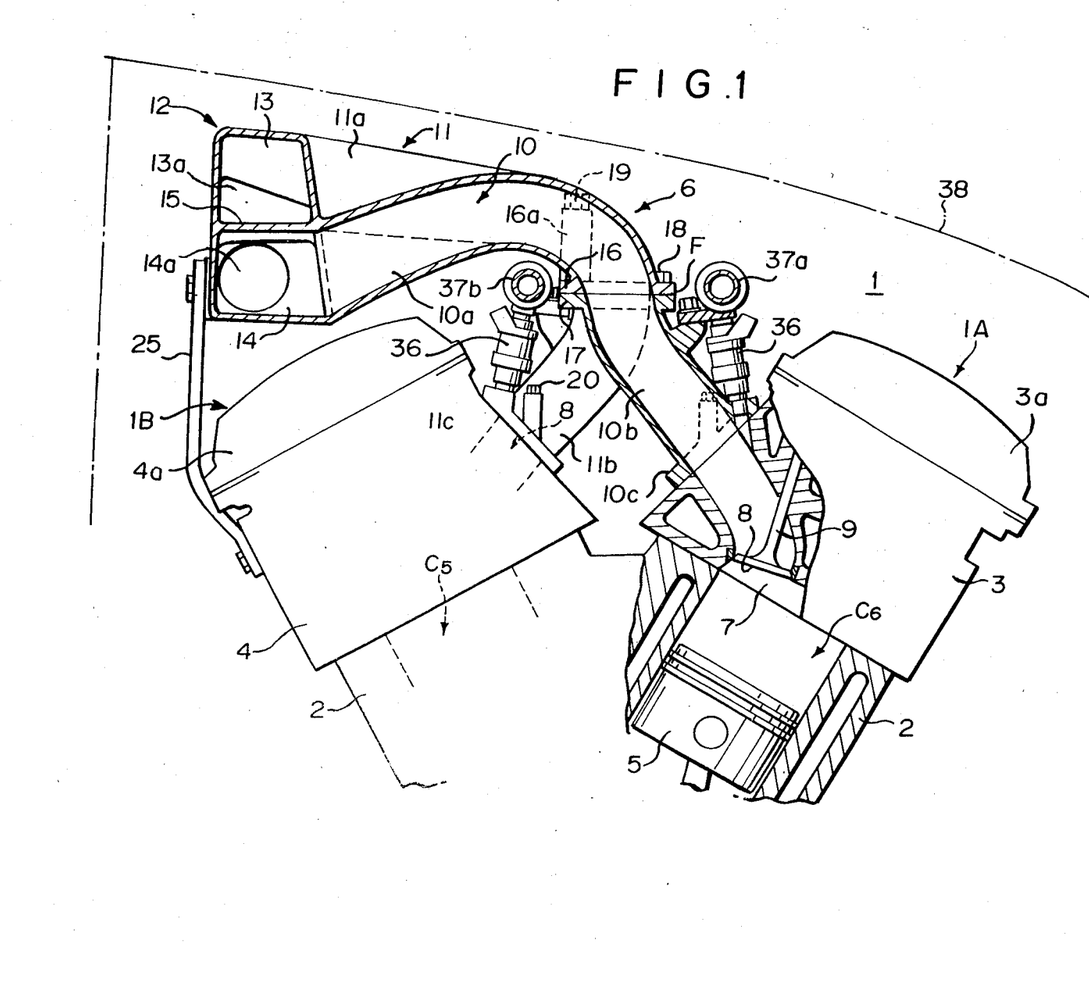
FIG. 1 is a schematic drawing showing a left side view of the essential portion of a V-type internal combustion engine having an induction system which is an embodiment of the present invention and a cross-sectional view of parts thereof.
Figure 2:
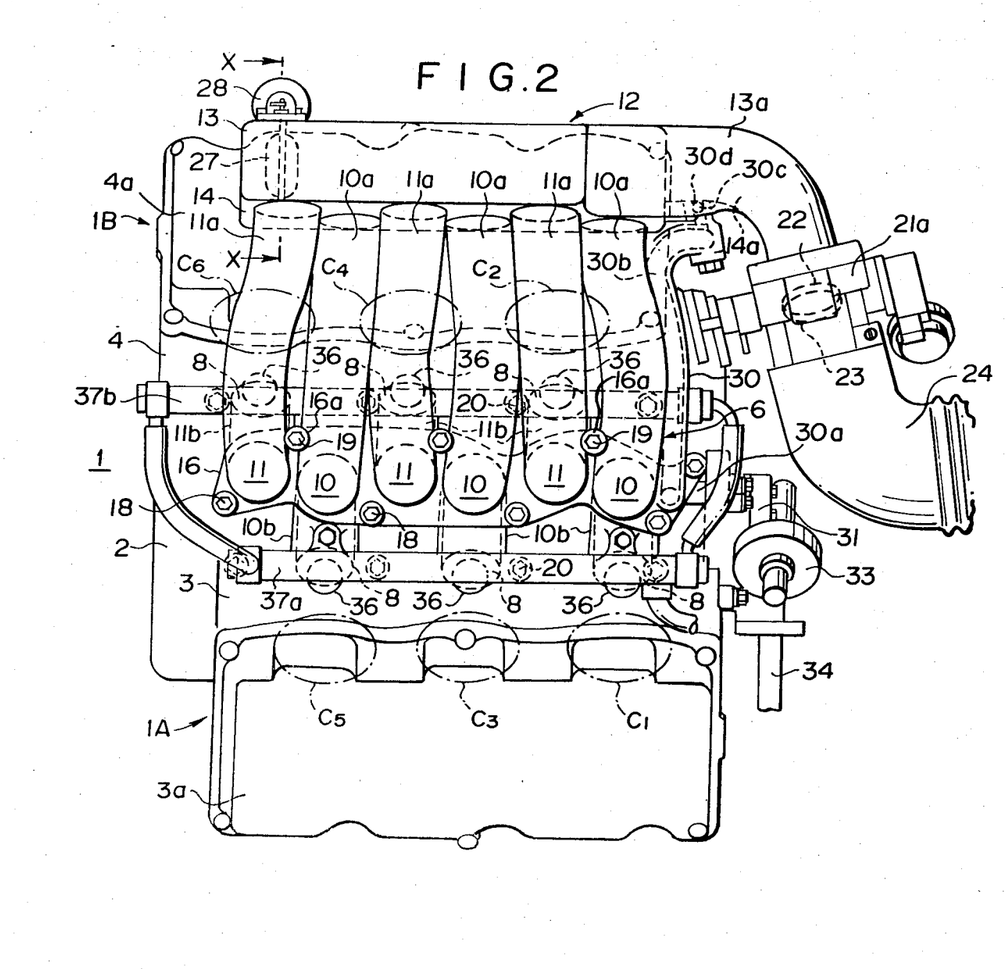
FIG. 2 is a schematic drawing showing a plan view of said essential portion.

Referring to the drawings, particularly to FIGS. 1 and 2, there is shown a V-type engine 1 having six cylinders which is disposed in an engine room provided in the front portion of a vehicle body so that the output shaft thereof extends laterally. The cylinders C1 to C6 are divided into two groups of cylinders each consisting of three cylinders. The cylinders C1, C3 and C5 constitute a front bank 1A and the cylinders C2, C4 and C6 constitute a rear bank 1B. The front bank 1A and the rear bank 1B are arranged in a V-formation with a predetermined relative bank angle, for example, a relative angle of 60 degrees. The cylinders C1, C3 and C5 belonging to the front bank 1A and the cylinders C2, C4 and C6 belonging to the rear bank 1B are in staggered relation.

The engine 1 has a cylinder block 2 provided with cylinder bores on the inner wall of which pistons 5 can slide, a front cylinder head 3 provided for the front bank 1A and a rear cylinder head 4 provided for the rear bank 1B. Cylinder head covers 3a and 4a having various means such as a valve driving means are provided to cover the upper portions of the front cylinder head 3 and the rear cylinder head 4 respectively. A combustion chamber 7 is formed in the space between the top of the piston 5 and the cylinder head 3 in the cylinder bore. An intake port 8 and an exhaust port (not shown) open into each combustion chamber 7, and are opened and shut at predetermined timing by an intake valve 9 and an exhaust valve (not shown) respectively.

The induction system has an intake manifold 6 having first and second independent intake passages 10 and 11, each connected with one of the intake ports 8 of the cylinder heads 3 and 4 and a surge tank 12 disposed above the rear bank 1B with which the first and second independent intake passages 10 and 11 are connected at the upstream end thereof. The first and second intake passages 10 and 11 are disposed so that openings thereof face each other and toward a portion between the bank 1A and 1B and they have same length.

The surge tank 12 has a long box-like shape and is disposed laterally with respect to the longitudinal direction of the vehicle body. The inside of the surge tank 12 is divided into an upper tank 13 for the rear bank 1B and a lower tank 14 for the front bank 1A by a wall 15 extending in a substantially horizontal direction. The lower tank 14 is connected with the first independent intake passage 10 of the remoter bank, that is, the front bank 1A, and the upper tank 13 is connected with the second independent intake passage 11 of the nearer bank, that is, the rear bank 1B, in order to reduce the curvature of the first and second independent intake passages 10 and 11 and thereby decrease pressure losses through the first and second independent intake passages 10 and 11.

The first and second independent intake passages 10 and 11 are divided into first and second upstream intake passages 10a and 11a connected with the surge tank 12 and first and second downstream intake passages 10b and 11b connected with the intake port 8. The first and second upstream intake passages 10a and 11a are connected with respectively the first and second downstream intake passages 10b and 11b at a connecting surface portion F substantially horizontally disposed in an upper portion of the space between the banks 1A and 1B.

The first downstream intake passage 10b of the first independent intake passage 10 extends upwardly and backwardly toward said connecting surface portion F to be connected with the first upstream intake passage 10a there and the first upstream intake passage 10a extends with slight curvature slightly downwardly toward the rear portion of the vehicle body to be connected to the side portion of the lower tank 14 of the surge tank 12 disposed above the rear bank 1B. On the other hand, the downstream intake passage 11b of the independent intake passage 11 extends upwardly and forwardly toward the connecting surface portion F to be connected with the upstream intake passage 11a and the upstream intake passage 11b extends backwardly and substantially horizontally with a slight curvature to be connected with the side portion of the upper tank 13 of the surge tank 12. Due to the above, it is possible to reduce the curvature of the first and second independent intake passages 10 and 11 and thereby to reduce the pressure losses of the intake air through the first and second independent intake passages 10 and 11.

The first upstream intake passages 10a are connected with the lower surge tank 14 at positions disposed at substantially equal intervals and the second upstream intake passages 11a are also connected with the upper surge tank 13 at positions disposed at substantially equal intervals. As a result, a bank of the openings of the upper surge tank 13 to be connected with the second upstream intake passage 11a is arranged to be shifted to the left, as seen in FIG. 2, from that of the lower surge tank 14 to be connected with the first upstream intake passages 10a, since the front bank 1A is disposed to be shifted to the right relative to the position of the rear bank 1B. As a result, the upper tank 13 has a shape extending downwardly toward the right end and a communication controlling valve hereinafter described is provided at the left end of the lower tank 14.

Further, as shown in FIG. 2, the first upstream intake passages 10a for the first and third cylinders C1 and C3 are formed to be curved to the right and the second upstream intake passage 11a of the fourth and sixth cylinders C4 and C6 are formed to be curved to the left. Accordingly, there is a free space between the first upstream intake passages 10a for the cylinders C1, C3 and C5 of the front bank 1A and the second upstream intake passages 11a for the cylinders C2, C4 and C6 of the rear bank 1B.

The first and second upstream intake passages 10a, 11a and the surge tank 12 are formed integrally and the first and second downstream intake passages 10b and 11b are secured with the banks 1A and 1B by connecting flanges 10c and 11c formed at the downstream ends thereof with the bank 1A and 1B by means of connecting bolts 20 respectively. Further, the upstream intake passages 10a and 11a and the downstream intake passages 10a and 11a are connected with each other by connecting a flange 16 and a flange 17 so that the connected surface thereof is substantially horizontal. Furthermore, it is preferable that each second upstream intake passage 11a and each second downstream intake passage 11b be connected smoothly and that a tangential plane of an outer surface of the each second upstream intake passage 11a and each second downstream intake passage 11b at the connecting portion and the connected surface meet at a right angle.

The flange 16 is formed integrally with the upstream intake passages 10a and 11a, and the flange 17 is formed integrally with the downstream intake passages 10b and 11b. A boss portion 16a on the flange 16 is formed to extend upwardly in the free space between the first upstream intake passages 10a for the cylinders of the front bank 1A and the second upstream intake passages 11a for the cylinders of the rear bank 1B in order to make it easy to connect the bolt 19 therewith.

Figure 4:
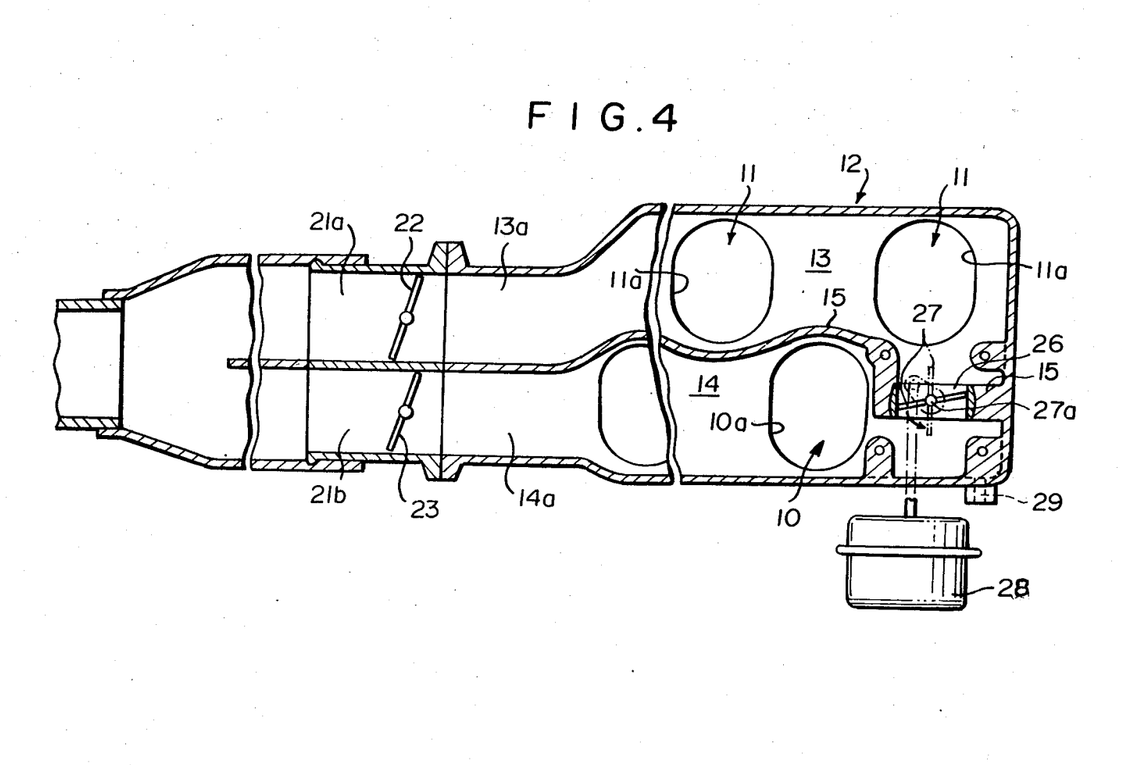
FIG. 4 is a schematic drawing showing a cross-sectional view taken along line Y—Y of FIG. 3.

The upper tank 13 and the lower tank 14 are curved upstream to extend forwardly toward upper and lower upstream tank portion 13a and 14a respectively and the upper and lower upstream tank portion 13a and 14a are connected with an upper throttle body 21a and a lower throttle body 21b respectively as shown in FIG. 4. The throttle valves 22 and 23 for controlling the amount of intake air are provided in the upper upstream tank portion 13a and the lower upstream tank portion 14a respectively. The upper throttle body 21a and the lower throttle body 21b join into a main intake passage 24 upstream and an air cleaner (not shown) is provided upstream in the main intake passage 24. The surge tank 12 is supported by being connected with the cylinder head 4 by means of a connecting means 25.

Figure 3:
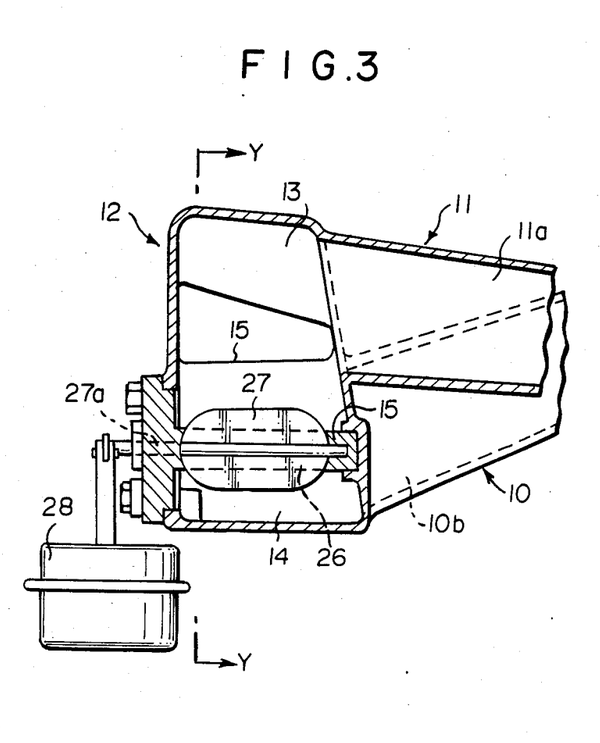
FIG. 3 is a schematic drawing showing a cross-sectional view taken along line X—X of FIG. 1.

The upper tank 13 and the lower tank 14 are communicated with each other through a communicating passage 26 provided at the left end of the lower tank 14 as shown in FIGS. 3 and 4. The communication controlling valve 27 is provided in the communicating passage 26 for controlling the area of the opening of the communicating passage 26. More specifically, the wall 15 is curved downwardly in the vicinity of the position at which the second upstream intake passage 11a for the sixth cylinder C6 is connected with the upper tank 13 and the communicating passage 26 is bored in such downwardly curved portion of the wall 15. A shaft 27a of butterfly-type of the communication controlling valve 27 is disposed in the longitudinal direction of the vehicle body and the opening of the communicating passage 26 is controlled by rotating the communication controlling valve 27 by means of an actuator 28 in accordance with the engine r.p.m. so that the opening of the communicating passage 26 is increased as the engine r.p.m. is increased.

A drain port 29 for discharging water produced by condensation and the like out of the surge tank 12 is provided at the bottom of the surge tank 12 and water in the lower tank 14 is discharged through said drain port 29 together with water produced in the upper tank 13 and led into the lower tank 14 through the communicating passage 26 when the communication controlling valve 27 is opened. The drain port 29 is communicated with the intake manifold 6 downstream of the surge tank 12.

Figure 5:
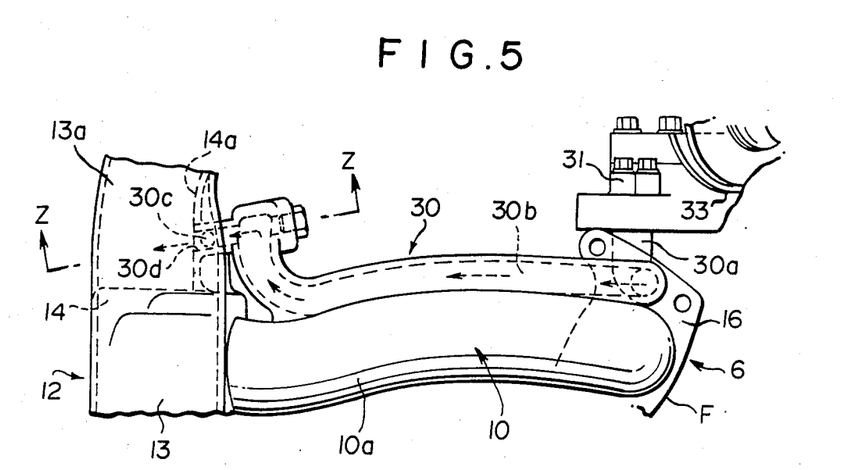
FIG. 5 is a partial schematic plan view showing a structure of an exhaust gas recirculation passage for recirculating exhaust gases.
Figure 6:
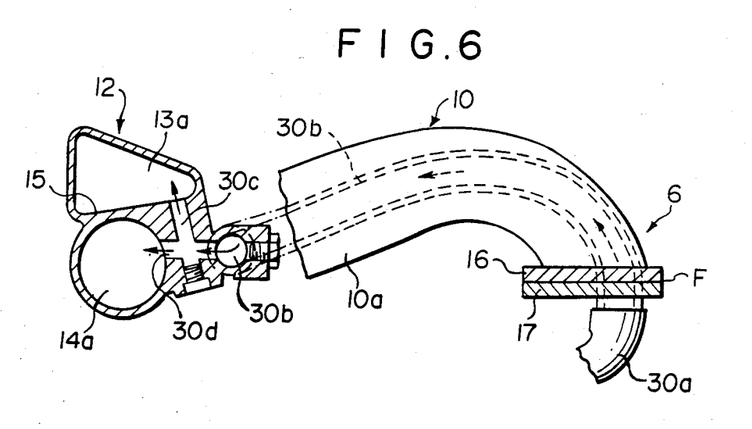
FIG. 6 is a schematic drawing showing a cross-sectional view taken along line Z—Z of FIG. 5 and a side structure of the exhaust gas recirculation passage.

Further, an exhaust gas recirculation (hereinafter referred to as EGR) passage 30 for recirculating exhaust gases to decrease the amount of emitted nitrogen oxide gas is provided in the intake system as shown in FIGS. 5 and 6. An EGR adaptor 31 in which an EGR valve 33 is provided for opening and shutting the EGR passage 30 is disposed in a right portion between the banks 1A and 1B and an EGR pipe 34 is connected with the EGR adaptor 31 to lead the EGR gases to the EGR adaptor 31 as shown in FIG. 2.

The EGR passage 30 extends through the EGR adaptor 31 and an outlet portion 30a to the flanges 16 and 17, and a downstream EGR passage 30b communicated with the EGR passage 30 and formed integrally with the upstream intake passage 10a is provided inside of the upstream intake passage 10a for the cylinder C1. The downstream EGR passage 30b is communicated with the upper upstream tank portion 13a through an opening 30c and with the lower upstream tank portion 14a through an opening 30d. Consequently, it is possible to recirculate uniform amount of the EGR gas to each cylinder.

A fuel injector 36 for injecting fuel into the intake port 8 of the cylinders C1 to C6 is provided on the flanges 10c and 11c at the ends of the downstream intake passage 10b and 11b. The injector 36 is connected with a fuel distributing pipe 37a for the front bank 1A and another fuel distributing pipe 37b for the rear bank 1B and fuel is fed to the fuel injector therefrom. Further, a bonnet 38 for covering the engine room is disposed above the engine 1 an extends forwardly and downwardly.

The firing order of the six cylinder V-type engine is set as C1-C2-C3-C4-C5-C6 in this embodiment wherein the cylinders C1, C3 and C5 belong to the front bank 1A and the cylinders C2, C4 and C6 belong to the rear bank 1B. Therefore, after a firing occurred in a cylinder connected to either the upper same tank 13 or the lower tank 14, a firing does not follow in a cylinder connected to the same surge tank 13 or 14. In other words, when a firing occurs in a cylinder connected to the upper tank 13, successive firing occurs in a cylinder connected to the lower tank 14. As a result, interference between the intake air of the respective cylinders does not occur in the surge tank 12.

Further, it is possible to improve the power output of the engine by utilizing the pressure wave transmitted upstream of the surge tank 12 in this embodiment as described hereinbelow. A negative pressure wave generated in each cylinder by opening and shutting the intake valve 9 in an intake step is transmitted to the upper tank 13 or the lower tank 14 through the independent intake passage 10 or 11. The phase of the negative pressure wave generated in the cylinders belonging to the front bank 1A is reverse to that in the cylinders belonging to the rear bank 1B in this embodiment due to the firing order as described above. Accordingly, since the independent intake passages 10 and 11 for each cylinder have same length, the pressure wave transmitted to the upper tank 13 is shifted by a half wavelength relative to that transmitted to the lower tank 14. These pressure waves are further transmitted through the upstream tank portion 13a or 14a and the throttle body 21 to the main intake passage 24 to interfere with each other at a joining point and are inverted to be positive pressure waves and are returned to the combustion chamber 7. The so obtained positive pressure waves increase the charging efficiency and yield the high power output of the engine by harmonic resonance effect.

Further, in this embodiment, since it is possible to lengthen the independent intake passages 10 and 11 sufficiently, the power output of the engine can be remarkably increased by the inertia effect generated by the pressure waves reflected by the upper and lower tank 13 and 14. Further, the inertia effect and the harmonic resonance effect can be effectively utilized over a wider range of engine r.p.m. by controlling the volume effect of the upper and lower surge tank 13 and 14 by adjusting the opening of the communication controlling valve 27.

According to the above described embodiment, it is very easy to assemble parts into the induction system as described hereinbelow. First of all, since each independent intake passage 10 and 11 is divided into two components, the upstream intake passage 10a, 11a and the downstream intake passage 10b, 11b, and the downstream intake passages 10b and 11b are connected with each other by the flanges 16 and 17, the flange 10c and 11c of the downstream intake passages 10b and 11b can be easily connected with the cylinders without interference from the upstream intake passages 10a and 11a, and the fuel injectors 36 and the fuel distributing pipes 37 can be also easily connected with the cylinders. Further, since the upstream intake passages 10a and 11a are formed integrally with the surge tank 12 and the connecting surface portion F connecting the upstream intake passage 10a, 11a and the downstream intake passage 10b, 11b is substantially horizontally arranged, the flanges 16 and 17 can be easily connected even at the boss portion 16a behind the upstream intake passage 10a by screwing the bolts 19.

Further, since the curvature of the independent intake passages 10 and 11 can be made small, the pressure losses therethrough can be controlled to be small and sufficient amounts of intake air can be fed to the combustion chamber 7 under high r.p.m. condition.

Further, since the intake system is not provided above the front bank 1A, the clearance between the engine 1 and the hood 38 can be made sufficiently small. On the other hand, although the intake system is provided above the rear bank 1B, since the hood 38 extends backwardly and upwardly and the clearance between the rear bank 1B and the hood 38 is relatively large, the intake system can be easily arranged in the space between the rear bank 1B and the hood 38 with the intake passages having sufficient length.

Further, according to the above described embodiment, since the upper tank 13 connected with the independent intake passage 11 for the cylinders of the rear bank 1B and the lower tank 14 connected with the independent intake passage 10 for the cylinders of the front bank 1A are disposed to be shifted with respect to each other in the lateral direction of the vehicle body, the communicating passage 26 and the communication controlling valve 27 can be arranged in thus obtained free space on the left side of the lower tank 14 and the size of the induction system can be reduced.

Although, in the embodiment described above, the present invention is applied to a laterally disposed V-type engine, the present invention can be applied to other types of V-type engines similarly.

Further, the upstream intake passages 11a may be arranged above another upstream intake passage 10a in order to reduce the width of the induction system.

Furthermore, although each upstream intake passage 11a extends substantially horizontally from the upper surge tank 13 in the above described embodiment, it may be arranged to extend upwardly from the upper surge tank 13 in the vicinity of the upper surge tank 13 so as to make the length of each independent intake passage 10 equal to that of each of another independent intake passage 11 to minimize the difference in the pressure losses between the independent intake passages 10 and 11.

The present invention has thus been shown and described with reference to a specific embodiment. However, it should be noted that the present invention is in no way limited to the details of the described arrangements but changes and modifications may be made without departing from the scope of the appended claims.

What is claimed:

1. An induction system for a V-type internal combustion engine having a first bank and a second bank respectively constituted with a plurality of cylinders and shifted with respect to each other in the direction of alignment of said cylinders, including intake ports provided to face the space between said first and second banks, each being communicated with one of said cylinders, fuel injection means for injecting fuel into said cylinders, each provided in the vicinity of one of said intake ports, fuel distributing means for distributing fuel to said fuel injection means arranged in the direction of alignment of said cylinders in a space between said first and second bank, each connected with one of said fuel injection means, a first and second surge tank means having a predetermined inner volume, each feeding intake air to one of said banks, said first surge tank means overlying said second surge tank means, said first and second surge tank means being arranged in the direction of alignment of said cylinders above said first bank, first independent intake passage means each connected with the side portion of said first surge tank means at one end thereof and with one of said intake ports of the cylinders constituting the first bank to lead intake air thereto at the other end, and second independent intake passage means each connected with the side portion of said second surge tank means at one end thereof and with one of said intake ports of the cylinders constituting said second bank at the other end thereof, said first and second independent intake passage means consisting of downstream intake passage means and upstream intake passage means, each said downstream intake passage means connected with one of said intake ports and extending toward a space between said fuel distributing means, each said upstream intake passage means being curved above the fuel distributing means for distributing fuel to the fuel injector means provided for the cylinders of the first bank and connected with said downstream intake passage means at one end thereof and with said first or second surge tank means at the other end thereof.

2. An induction system in accordance with claim 1 in which said first and second banks are arranged with a relative bank angle of 60 degrees.

3. An induction system in accordance with claim 1 in which said first and second surge tank means have a long box like shape and are separated by a partition wall from one another.

4. An induction system in accordance with claim 1 in which said first and second surge tank means are shifted in the direction of alignment of the cylinders and in which a communicating passage means for communicating the first and second surge tank means is provided in a space formed by a side portion of one of the first and second surge tank means and an end portion of the remaining surge tank means and in which a communication controlling valve means for controlling an opening of said communicating passage means is provided in said communicating passage means.

5. An induction system in accordance with claim 4 in which said communicating passage means is connected with the lower side portion of the first surge tank means at one end thereof and with the end portion of the second surge tank means at another end thereof.

6. An induction system in accordance with claim 1 further including a first and second independent intake supplying passage means having a predetermined length provided upstream said first and second surge tank means respectively for supplying intake air into the first and second surge tank means respectively.

7. An induction system in accordance with claim 1 in which said first bank is disposed rearward of an output shaft of the engine disposed laterally with respect to the longitudinal direction of the vehicle.

8. An induction system in accordance with claim 6 in which each of said first and second independent intake supplying passage means is connected with one end of said first and second surge tank means respectively.

9. An induction system in accordance with claim 1 in which said upstream intake passage means and said downstream intake passage means are connected at a substantially horizontal surface to each other.

10. An induction system in accordance with claim 9 which further includes an upper flange formed integrally with all of said upstream intake passage means at the downstream end thereof and a lower flange formed integrally with all of said downstream intake passage means at the end thereof and in which said upstream intake passage means and said downstream intake passage means are connected by connecting said upper and lower flanges.

11. An induction system in accordance with claim 1 in which said upper and lower flanges are connected by bolts and which includes a boss portion provided on the upstream intake passage means for the first bank and projected upwardly between said upstream intake passage means.

12. An induction system in accordance with claim 1 in which a bank of openings of said first surge tank means to be connected with said first independent intake passage means is arranged to be shifted from that of said second surge tank means to be connected with said second independent intake passage means in the direction of the alignment of the cylinders and in which said first upstream intake passage means is arranged above said second upstream intake passage means.

13. An induction system in accordance with claim 9 in which said first upstream intake passage means is arranged to extend upwardly from said first surge tank means in the vicinity thereof.

14. An induction system for a V-type internal combustion engine having a first bank and a second bank respectively constituted with a plurality of cylinders and shifted with respect to each other in the direction of alignment of said cylinders including intake ports provided to face a space between said first and second banks, each communicated with one of said cylinders, a surge tank means having a predetermined inner volume for feeding intake air to banks, said surge tank means being arranged above said first bank in the direction of alignment of said cylinders, first independent intake passage means each connected with a side portion of said surge tank means at one end thereof and with one of said intake ports of the cylinders constituting said first bank to lead intake air thereto at the other end, and second independent intake passage means each connected with a side portion of said surge tank means at one end thereof and with one of said intake ports of the cylinders constituting said second bank at the other end thereof, said first independent intake passage means being connected with said surge tank means at a point higher than a point where said second independent intake passage means is connected with said surge tank means, said first and second independent intake passage means respectively consisting of downstream intake passage means connected with said intake port and upstream intake passage means connected with said downstream intake passage means at one end thereof and with said surge tank means at another end thereof, each said downstream intake passage means extending toward a space between said first and second banks from one of said intake ports, each said upstream intake passage means extending curvedly from a connecting portion where it is connected with said downstream intake passage means to said surge tank means, said connecting portion being substantially horizontal, said first upstream intake passage means and said first downstream intake passage means being curved to the same direction, said second upstream intake passage means and said second downstream intake passage means being curved reversely.

15. An induction system in accordance with claim 14 which further includes fuel injection means for injecting fuel into said cylinders, each being provided in the vicinity of one of said intake ports and fuel distributing means for distributing fuel to the fuel injection means arranged in the direction of alignment of said cylinders in the space between said first and second banks, each being connected with one of said fuel injection means, said fuel injection means for said first bank and said fuel distributing means for the first bank being arranged inside a space defined by said first upstream and downstream intake passage means, said fuel injecting means for said second bank and said fuel distributing means for the second bank being arranged in a space above said second downstream intake passage means.

16. An induction system in accordance with claim 15 in which said first and second banks are arranged with a relative bank angle of 60 degrees.

17. An induction system in accordance with claim 14 in which said surge tank means consists of a first surge tank means connected with said first independent intake passage means and a second surge tank means connected with said second independent intake passage means, said first surge tank means overlying said second surge tank means.

18. An induction system in accordance with claim 17 in which said first and second surge tank means are shifted in the direction of alignment of the cylinders and in which a communicating passage means for communicating the first and second surge tank means is provided in a space formed by the lower side portion of the first surge tank means and the end portion of said second surge tank means and in which a communication controlling valve means for controlling an opening of said communicating passage means is provided in said communicating passage means.

19. An induction system in accordance with claim 15 in which each of said first upstream and downstream intake passage means are connected smoothly with each other and in which a tangential plane to an outer surface of said first upstream and downstream intake passage means at the connecting portion intersects with a plane of the connected surface thereof at a right angle.

* * * * *